United States Patent [19]

Will et al.

[11] 4,222,292
[45] Sep. 16, 1980

[54] METHOD AND APPARATUS FOR REDUCING JOLT IN VEHICLE AUTOMATIC TRANSMISSIONS

[75] Inventors: Gerhard Will, Steinheim; Walter Stroh, Sachsenheim, both of Fed. Rep. of Germany

[73] Assignee: Robert Bosch GmbH, Stuttgart, Fed. Rep. of Germany

[21] Appl. No.: 869,449

[22] Filed: Jan. 16, 1978

[30] Foreign Application Priority Data

Jan. 26, 1977 [DE] Fed. Rep. of Germany ....... 2703009

[51] Int. Cl.³ .............................................. B60K 17/12
[52] U.S. Cl. ........................................ 74/866; 74/861
[58] Field of Search ............... 74/866, 861, DIG. 6, 74/856

[56] References Cited

U.S. PATENT DOCUMENTS

| | | | |
|---|---|---|---|
| 2,986,045 | 5/1961 | Peras | 74/866 |
| 3,621,735 | 11/1971 | Lemieux | 74/866 X |
| 3,640,156 | 2/1972 | Mori et al. | 74/866 |
| 3,724,293 | 4/1973 | Wakamatsu | 74/866 |
| 3,732,753 | 5/1973 | Olsen | 74/866 |
| 3,738,182 | 6/1973 | Kubo et al. | 74/866 |
| 3,738,196 | 6/1973 | Kubo et al. | 74/866 |
| 3,750,495 | 8/1973 | Ito et al. | 74/866 |
| 3,805,640 | 4/1974 | Schneider et al. | 74/866 X |
| 4,026,169 | 5/1977 | Kuhnle et al. | 74/861 |

Primary Examiner—Leslie Braun
Attorney, Agent, or Firm—Frishauf, Holtz, Goodman & Woodward

[57] ABSTRACT

In order to be able to reduce the jolt produced by the transmission going into gear when the vehicle is standing still or moving only slowly, the shifting of the gear range selector lever from neutral gear into any drive range gear is caused to operate magnetic valves controlling the automatic transmission to set the transmission in the highest gear for a very brief period, enough to reduce the jolt, but not enough to interfere with the normal progress of automatic gear shifting.

10 Claims, 3 Drawing Figures

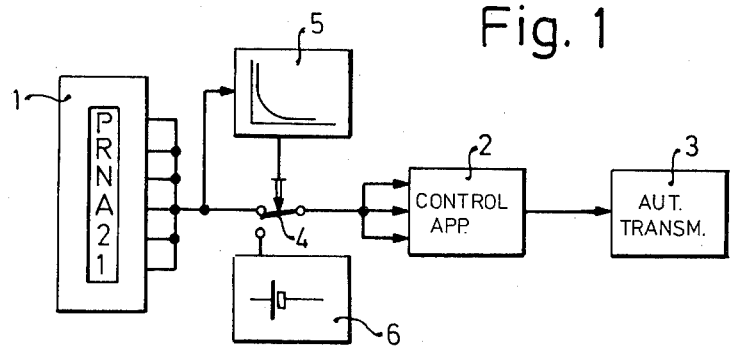
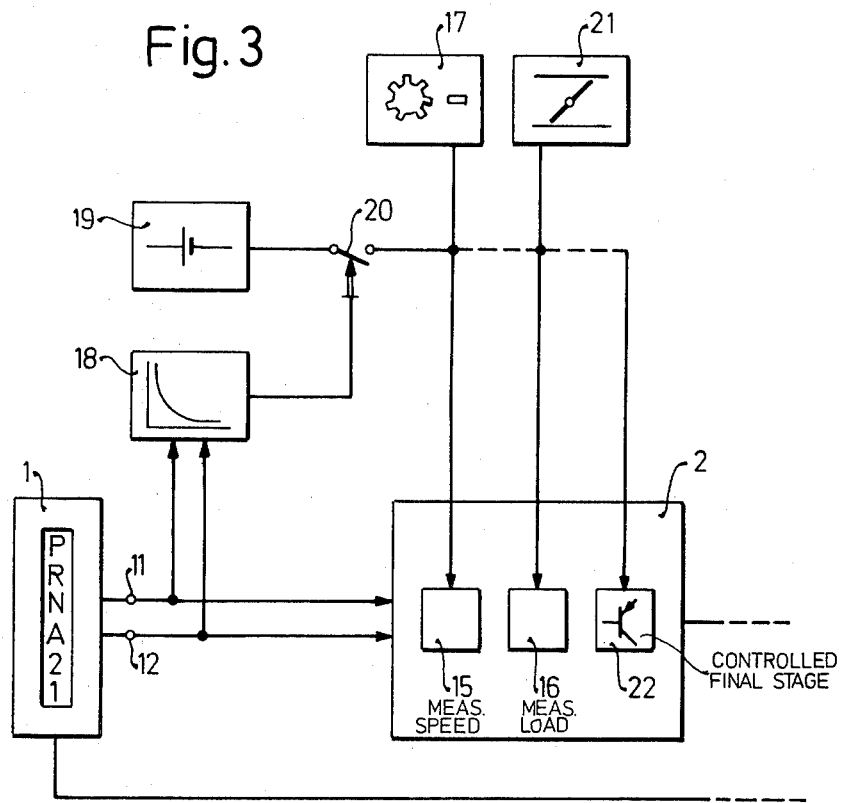

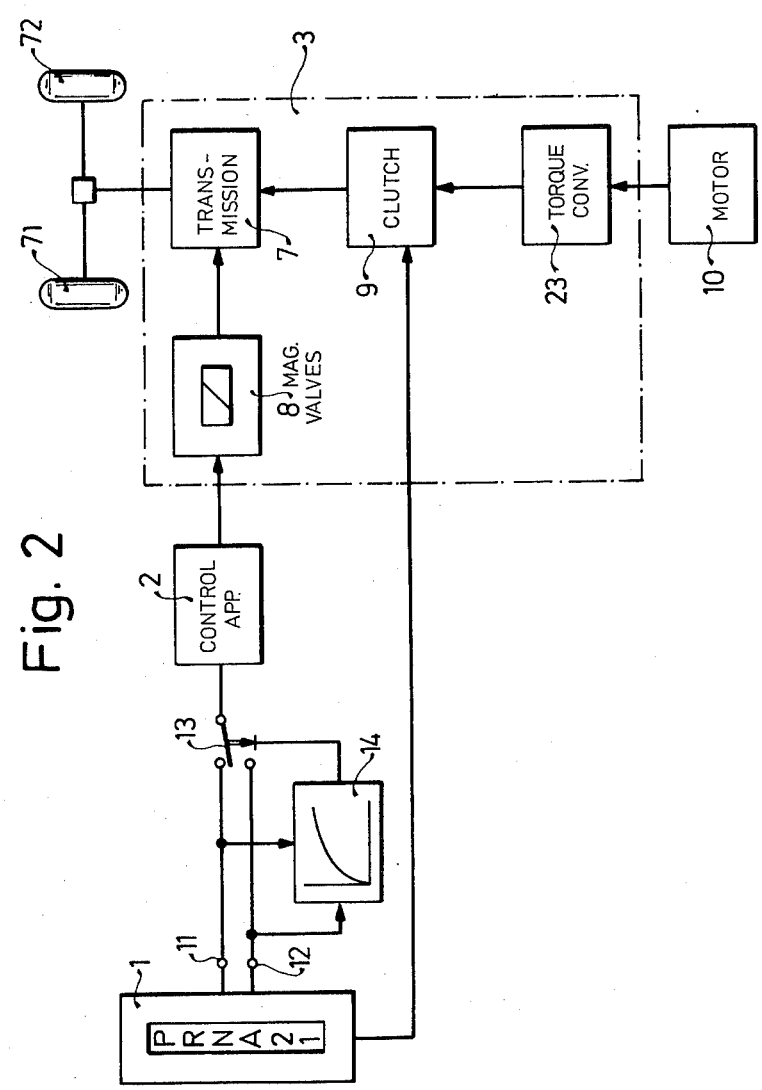

METHOD AND APPARATUS FOR REDUCING JOLT IN VEHICLE AUTOMATIC TRANSMISSIONS

This invention concerns a method and apparatus for reducing the jolt produced when an automatic transmission in a motor vehicle is put into gear, particularly when the vehicle is at rest and the gear range selector is shifted from a neutral gear to a forward drive gear.

BACKGROUND AND PRIOR ART

There have already been proposed methods for supressing the jolt upon shifting gears in motor vehicles equipped with automatic transmissions, but the known methods relate only to the jolt that takes place when the vehicle is moving, in starting up or in shifting gears. In such methods as a rule, the jolt effect on the vehicle at the time is detected, compared with the maximum permissible jolt and the difference is used to provide a regulation of the gear shifting jolt. In the case of vehicles equipped with automatic stepwise operating transmissions, a jolt also occurs when, after the motor is already running, the selector lever by which the ranges of the automatic stepwise transmission can be selected, is moved out of the position which corresponds to the neutral range (N) and is moved over into a position that corresponds to a drive range A. Usually in starting up, the selector lever is moved over from the position (N) into the position A and the first gear is thereby set into operation in the transmission. At the same time, a clutch is engaged that connects the running motor through a torque converter with the transmission. The previously revolving parts of the transmission input are braked. The slip then takes place in the torque converter. This sudden braking of the transmission input is, however, accompanied by a jolt. In the known methods and devices, the jolt on going into gear is only controlled in the case of vehicles already in motion, and it is therefore not possible, with those methods and their corresponding devices, to reduce or to regulate out the jolt that occurs upon switching over from a neutral gear range into a drive gear range of an automatic stepwise transmission.

THE PRESENT INVENTION

It is an object of the present invention to provide an arrangement of apparatus that makes it possible to reduce the jolt effect of putting the transmission in gear even during a standing start.

Briefly, in shifting out of neutral into a forward drive gear, usually by shifting from neutral into fully automatic drive, the control circuit that controls the magnetic valves that set the gear that is in use or to be in use, momentarily selects the highest gear, just long enough to reduce the jolt effect, but not long enough to interfere with the normal operation of the automatic transmission. Preferably the highest gear is set in the transmission while the selector lever has selected the neutral gear position, in which case, when the selector lever is thrown into a forward drive position, a selection of the highest gear position of the transmission is held by a delay circuit for a short predetermined time. Where the automatic transmission is controlled at least in part by vehicle speed or by engine load, the desired effect may be produced by imposing a signal in the control circuit of the automatic transmission that for the predetermined time period corresponds to a high vehicle speed or to light engine loading. In that manner the higher gear condition can be provided or extended briefly.

By this invention, therefore the jolt effect is reduced in putting the transmission into gear even while the vehicle is standing still.

For this purpose the control circuit of the electronic transmission control, when it switches over into a "drive" state of operation, is confronted for a predetermined period of time with an applied voltage that corresponds to a high gear, preferably the highest gear of the transmission. In consequence, for the predetermined period of time, the high or highest gear is put into operation.

In a further development of the invention, for application to such transmission controls in which in the neutral position of the selector lever the magnetic valves are in the condition which corresponds to the highest gear, it is provided that the signals corresponding to the neutral gear range are delayed or held on before being removed from the input of the control circuit that operates the magnetic valves. In another preferred embodiment of the invention, utilizing a transmission control system that includes circuits for detection of the vehicle speed and of the vehicle engine loading condition, either a high vehicle speed or a low loading condition is simulated. In still another embodiment of the invention, the magnetic valves of the automatic stepwise transmission are directly delayed in their control operation.

The physical embodiments of equipment incorporating the invention and the method of the invention have in common the advantage that they utilize elements already found in the motor vehicle and only need to supply a delay circuit and a switchover circuit, which circuits can be integrated into an electronic transmission control system without great expense.

DRAWINGS, ILLUSTRATING EXAMPLES

Three embodiments of equipment for carrying out the method of the invention are illustrated by way of example in the drawings in which:

FIG. 1 is a basic diagram of a first embodiment of such equipment;

FIG. 2 is a basic diagram of a second embodiment of apparatus for carrying out the invention, in this case with delayed switching over into the automatic drive gear range, and FIG. 3 is a basic diagram of a third embodiment for carrying out the invention, in this case by influencing various stages in the electronic transmission control system.

DESCRIPTION OF THE ILLUSTRATIVE EMBODIMENTS

In vehicles with automatic stepwise transmissions it is common to connect an internal combustion engine with a clutch through a torque converter that forms a part of the automatic stepwise-operating transmission. The output shaft of the torque converter is connected through a clutch with a stepwise-operating transmission, usually a set of planetary gears that serves for switching the various gear ratios. For shifting there is in each case a particular unit of the planetary gear set, for example, the sun or the planets, or the strip, that is driven or braked with the assistance of hydraulically actuated clutches or brakes. By the selection and the braking of a particular portion of the planetary gear set, the shifting of the various gear ratios takes place. If now the automatic transmission is put by the selector lever into the neutral gear region (N), the motor is separated from the automatic stepwise operating transmission by the clutch interposed between motor, torque converter and transmission. If the transmission is shifted from the neutral range (N) into a drive region, usually the automatic range (A), in which all gears of the automatic stepwise operating transmission can be put into use at one time or another, then in the manner described above by operating magnetic valves in the stepwise-operating transmission constituted in the form of a planetary gear system, the first gear is put into operation and the clutch between the torque converter and the transmission is engaged. The parts located in the transmission input are then braked backwards, which is noticeable in the vehicle as a jolt. The jolt then taking place is high in a low gear and low in a high gear, since the high gear usually has a smaller gear ratio. For this reason, the transmission output torque and hence also the jolt force in high gear is made smaller. Accordingly, in the practice of the present invention, instead of the usual engagement of first gear upon switching over from the neutral range (N), a drive range (A) is put into effect for a short predetermined period of time.

FIG. 1 is the basic block diagram of a first embodiment of apparatus for carrying out the process of the present invention. The outputs of a gear selector lever 1 are connected through a control apparatus 2 with an automatic transmission 3. In the control connections between the outputs of the lever 1 and the control apparatus 2, a first switch of the form of a transfer switch is interposed by which the input of the control apparatus 2 can be transferred from the outputs of the lever 1 to the output of a first voltage source 6. The switch 4, of course, is electrically controlled and its control input is connected through a first delay circuit 5 with the outputs of the selector lever 1. In normal driving, the outputs of the lever 1 are connected with the control apparatus 2. If, however, the lever is moved over from the neutral region N to a drive region A, the first delay circuit 5 is put into action to provide that the input of the control apparatus 2 for a fixed period of time ($\Delta t$) determined by the first delay circuit 5 is connected to the output of a first voltage source 6. The output voltage of the first voltage source 6 is so determined in comparison to the output voltage or switch position of the lever 1, that the control apparatus 2 puts into use a high gear, preferably the highest gear in the automatic transmission 3.

FIG. 2 shows the basic block diagram of a second embodiment of apparatus for carrying out the method of the present invention. The selector lever 1 has a terminal 11 corresponding to the neutral gear region N and a terminal 12 corresponding to a drive gear region A. A second transfer switch 13 is located at the input of the control apparatus 2. The control apparatus 2 is operatively connected to the automatic transmission 3, here symbolized by a stepwise operating transmission 7 controlled by magnetic valves 8. A clutch 9 provides the power connection between an internal combustion engine 10, a torque converter 23 and the stepwise operating transmission 7. The output of the automatic transmission 3 operates on wheels 71 and 72. The control input of the second switch 13 is connected over a second delay circuit 14 to the terminal 12. The selector lever 1 is further more connected with the clutch 9.

The apparatus for carrying out the present invention of which the basic circuit diagram is given in FIG. 2, is intended for such motor vehicles with automatic stepwise transmissions in which in the position of the selector lever 1 that corresponds to the neutral region N the magnetic valves 8 are so controlled as to correspond with the highest gear. If now the selector lever is switched away from the position N to the position A, the second delay circuit 14 is started so that the second switch 13 for a predetermined time remains in the position of the selector lever corresponding to the position N. In that manner the control apparatus 2 for the predetermined time $\Delta t$ continues to encounter corresponding control voltage and the magnetic valves 8 commanded the highest gear of the stepwise transmission 7 to be engaged. If now the second delay circuit 14 completes its action and switches over the second switch 13, the control apparatus 2 is connected to the output A of the lever 1. In that manner, normal driving operation of the automatic transmission 3 is provided.

FIG. 3 shows the basic circuit of a third embodiment of apparatus for carrying out the method of the invention. The control apparatus 2, that acts upon the magnetic valves 8 in a manner not further shown in the drawing, contains a first measuring stage 15 for detecting the vehicle speed, a second measuring stage 16 for detecting the load condition of the engine and a final 22 for operating the magnetic valve. The first measuring stage 15 is connected to a tacho generator 17, the second measuring stage 16 to an engine load transducer 21 that may, for example, be responsive to the position of the engine throttle. The second voltage source 19 is connected through contacts of a normally open third switch 20 to each of the connections between the tacho generator 17 and the first measuring stage 15, between the load transducer 21 and the second measuring stage 16 and a control connection controlling the final stage 22. The control input of the third switch 20 is connected with the output of a third delay circuit 18 that is in turn connected with the N and A outputs of the selector level 1. The selector level 1 is in operative connection with the clutch 9 in a manner not further described or shown here.

In normal driving the third switch 20 is open. If now the selector lever is moved over from the neutral range N into a driving range A, the third delay circuit 18 is started and the third switch 20 is closed for a predetermined period of time $\Delta t$. The output of the second voltage source 19 is then superimposed on the output signals of the tacho generator 17 or of the load indicator 21 or else supplied to a control input of the final stage 22. The output voltage of the second voltage source 19 is of such magnitude that its superimposition on the output voltage of the tacho generator 17 simulates a high driving speed; its superimposition on the output voltage of the load indicator 21 simulates a low load condition. If the output voltage of the second voltage source 19 is applied to the final stage, the magnetic valves 8 of the automatic transmission 3 are put into the position that corresponds to the highest gear. In the apparatus illustrated in FIG. 3 for carrying out the method of the invention the simulation of a high vehicle speed or of a low engine load condition are alternatives either of which may be provided, but it is also possible to combine both of these operations in a suitable way. Likewise, taking over control of the final stage 22 is to be understood as usable either as an alternative for simulation of a high vehicle speed or of a low engine load.

Although the invention has been described with respect to particular illustrative embodiments, it will be understood that variations are possible within the inventive concept.

We claim:

1. An apparatus for reducing gear shifting jolt in a vehicle having a stepwise-operating automatic transmission equipped with a gear-range selection lever for selecting a neutral gear range (N) and at least two drive ranges, magnetic valves for determining the gear in which the transmission operates, a control apparatus for selectively operating the magnetic valves and at least one automatic clutch for establishing and interrupting power transfer between an engine and the transmission, said apparatus for reducing jolt comprising:
   a control circuit for connecting said gear selection lever (1) with said control apparatus (2);
   a first transfer switch (4) interposed in said control circuit for selectively connecting said control apparatus (2) to said gear-range selection lever (1) or to a first voltage source (6), said transfer switch having a control input, and
   a delay circuit (5) connected between contacts operated by said gear-range selector lever (1) and said control input of said first transfer switch (4) for causing voltage from said first voltage source to be applied to said control apparatus for a predetermined fixed period following movement of said lever out of neutral gear position to a drive range position and thereby causing said control apparatus to impose a higher gear for just the duration of said period.

2. An apparatus as defined in claim 1 in which there is provided a second transfer switch (13) through which said control apparatus (2) is connected either to a first output of said gear-range selection lever (1) corresponding to the neutral gear-range (N) or to a second output (12) of said gear-range selection lever (1) corresponding to a drive range (A) of said gear-range selection lever, and in which said second transfer switch has a control input and a second delay circuit (14) is provided through which said control input of said second transfer switch (13) is connected to said second output of said gear-range selection lever (1) and said second output of said gear-range selection lever is connected with said automatic clutch (9).

3. An apparatus as defined in claim 1, in which said gear-range selector lever (1) has a first output (11) corresponding to the neutral gear-range (N) and a second output (12) corresponding to a drive gear-range (A) and in which said conrol apparatus (2) is connected with said first and second outputs of said control apparatus (2) and in which a load transducer (21) is provided for producing an electrical signal corresponding to engine load, said load transducer (21) being connected to a measuring stage (16), said measuring stage (16) being connected through a normally open switch (20) to a second voltage source (19), said last mentioned switch (20) having a control input, and in which, further, a third delay circuit (18) is provided and interposed between said second output of said gear-range selection lever (1) and said control input of said last mentioned switch (20), said second output of said gear-range selection lever (1) being also connected with said automatic clutch (9).

4. An apparatus as defined in claim 1 in which the gear-range selection lever has a first output corresponding to said neutral gear-range (N) and a second output corresponding to a drive range (A) both said first and second outputs being connected to said control apparatus (2), and in which also said control apparatus has an output stage (22) for operating the magnetic valves (8), and in which further a normally open switch (20) is connected between said output stage (22) and a second voltage source (19), and in which, further, said last mentioned switch (20) has a control input and there is also provided a third delay circuit (18) through said last mentioned switch (20) is connected with said second output of said gear-range selecting lever (1), said second output of said gear range selecting lever (1) being also connected with said automatic clutch (9).

5. A method for reducing gear shifting jolt in a vehicle having a stepwise-operating automatic transmission equipped with a gear-range selection lever for selecting a neutral gear-range (N) and at least two drive ranges, magnetic valves for determining the gear in which the transmission operates, a control apparatus for selectively operating the magnetic valves and at least one automatic clutch for establishing and interrupting power transfer between an engine and the transmission, said method comprising the step of applying a first voltage for a predetermined limited period of time ($\Delta t$) to the control apparatus (2) which first voltage corresponds to operation in a high gear, whenever the gear-range selection lever (1) is moved over from a drive gear-range (A) followed automatically, at the end of said predetermined period of time, by application of a second voltage corresponding to a gear corresponding to the position of the gear-range selection lever.

6. A method as defined in claim 5 in which said first voltage corresponds to the highest gear of the transmission.

7. A method as defined in claim 5 in which in the position of said lever (1) corresponding to the neutral gear-range (N), the magnetic valves are in the condition that corresponds to the highest gear so that in the step of moving over said selection lever (1) from a position corresponding to a neutral gear-range (N) into a drive gear-range (A) the step of applying said first voltage for said predetermined period of time ($\Delta t$) to the control apparatus (2), which first voltage corresponds to operation in a high gear, is performed by delaying by said predetermined time ($\Delta t$) the switching of said first voltage over to said second voltage.

8. A method as defined in claim 5 in which said control apparatus contains a first measuring stage (15) for detecting the driving speed of the vehicle and in which the step of moving over the gear-range selection lever (1) from a position corresponding to a neutral gear-range (N) to a drive gear-range (A) there is also performed a step of applying to said first measuring stage (15) for said predetermined period of time ($\Delta t$) a voltage that corresponds to a high driving speed.

9. A method as defined in claim 5 in which control apparatus (2) contains a measuring stage (16) for detecting the load condition of the engine (10) and in which the step of moving over said gear-range selection lever from a position corresponding to a neutral gear-range (N) into a drive gear-range (A) a voltage is applied to said measuring stage (16) for said predeterimed period of time ($\Delta t$) which corresponds to the condition of low load.

10. A method as defined in claim 5, in which said control apparatus (2) includes a final stage (22) for operating the magnetic valves (8) and in which method the step of moving over said gear-range selection lever (1) from a position corresponding to a neutral gear-range (N) into a drive gear-range (A) the step is also performed of applying a voltage for said predetermined period of time ($\Delta t$) to said final stage (22) that corresponds to operation of the magnetic valves (8) for operating the transmission in the highest gear.

* * * * *